Aug. 27, 1935. H. M. A. STRAUSS 2,012,486
MIXING MACHINE
Filed Sept. 10, 1932 3 Sheets-Sheet 1

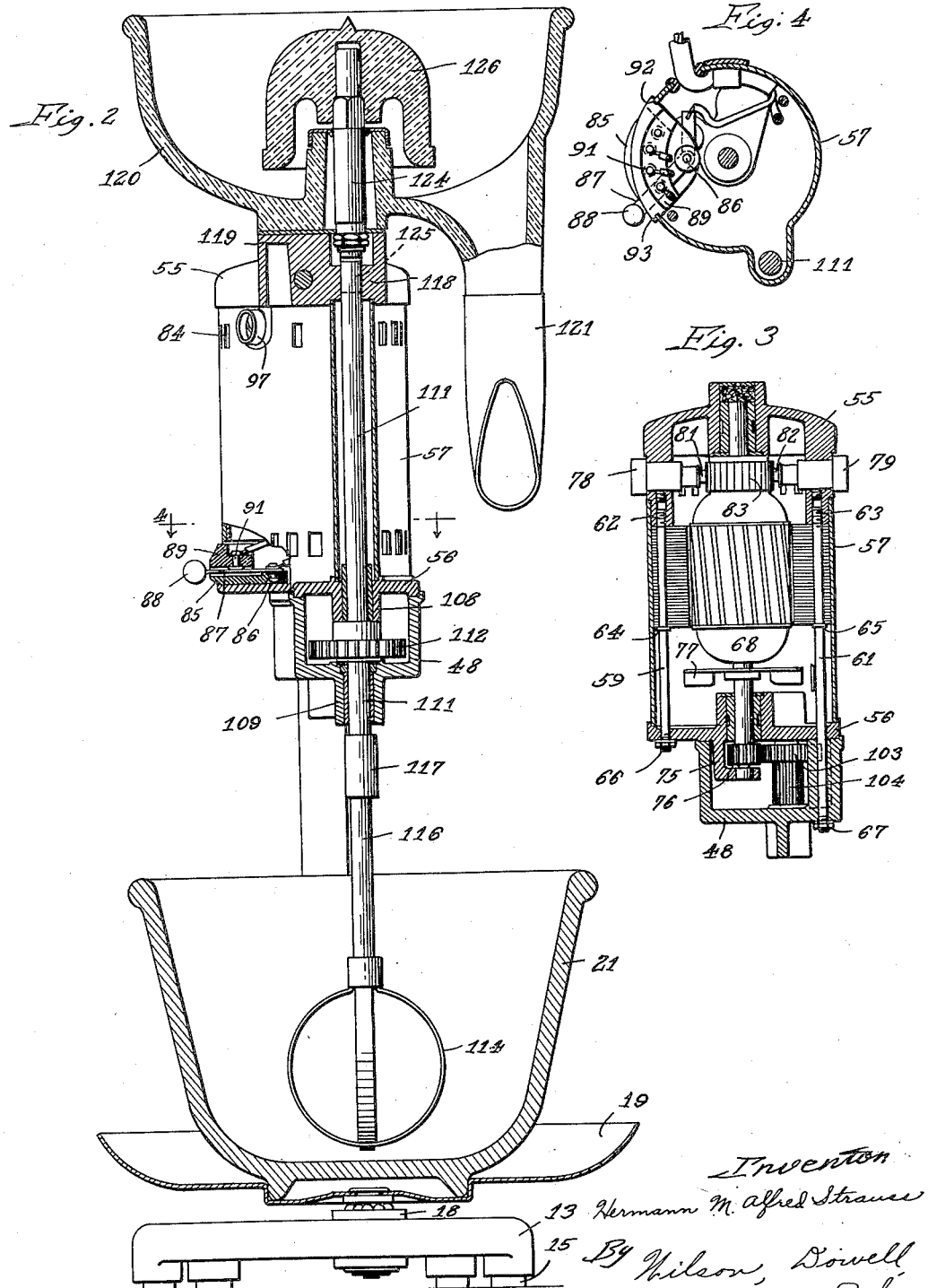

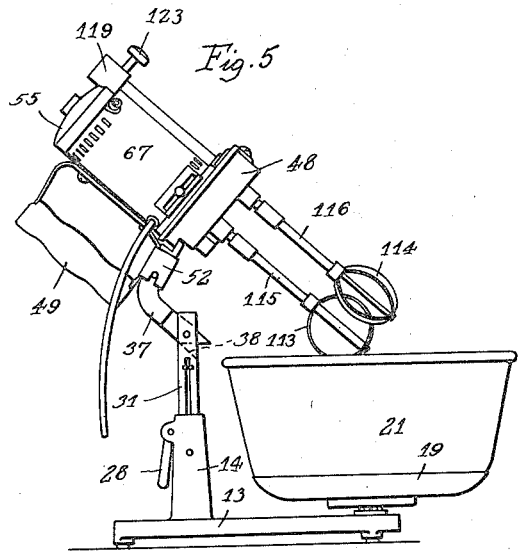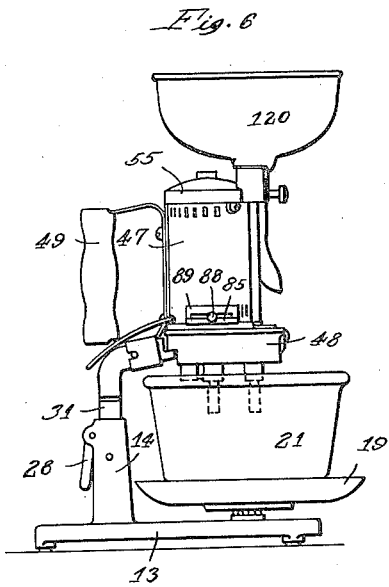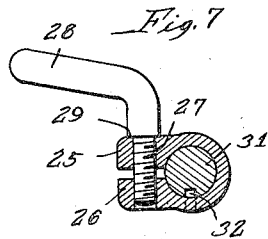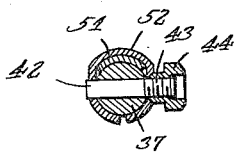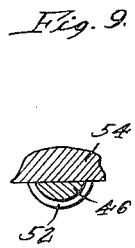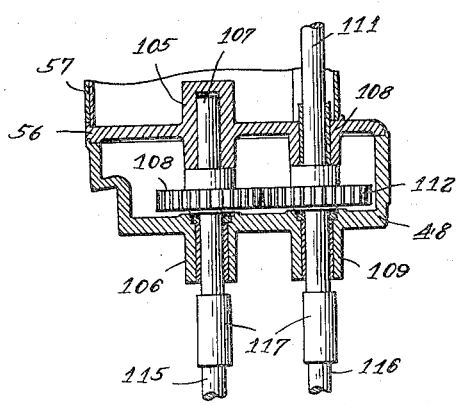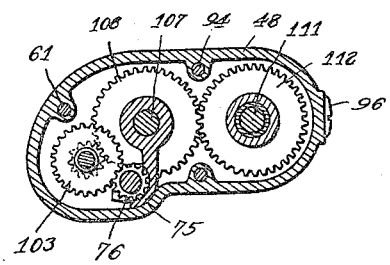

Patented Aug. 27, 1935

2,012,486

UNITED STATES PATENT OFFICE 2,012,486

MIXING MACHINE

Hermann M. Alfred Strauss, Western Springs, Ill., assignor to Chicago Flexible Shaft Company, Chicago, Ill., a corporation of Illinois Application September 10, 1932, Serial No. 632,571

10 Claims. (Cl. 259—84)

This invention relates to kitchen utensils and has special reference to a power operated combined mixer and juicer.

The primary aim of the present invention is the provision of a mixer and juicer construction possessing the essential advantages of high price mechanisms, which may be manufactured at considerably smaller cost.

A further object of the invention is the provision of a generally improved mixer and juicer of a construction such that the mixing bowls and beater elements normally occupy a number of fixed positions with respect to each other for maximum mixing efficiency and in which the driving motor and mixing elements are removable as a unit from their supporting stand for use as a portable mixing unit.

A further object of the invention is the provision of improved means for normally supporting the beater unit so that the elevation of the unit may be readily adjusted and so that the beater unit may be swung about a horizontal axis to facilitate the mixing operations and to allow the convenient positioning and removal of bowls from beneath the beater elements.

I have also aimed to provide a novel construction wherein a vertically disposed motor serves to support an offset gear box from which is driven one or more beater elements and a driven shaft extends along the side of the motor and has bearing support in the motor housing for the purpose of driving supplemental mechanisms.

Another object of the invention is the provision of improved gearing for the purpose of driving a beater element or elements from the motor.

I have also aimed to provide improved switch construction and improved means for supporting the switch on the motor housing.

Other objects and attendant advantages will become apparent to those skilled in the art from the following description and the accompanying drawings, in which—

Fig. 2 is a section taken at right angles to Figure 1 showing the juicer bowl and the juicer driving mechanism;

Fig. 3 is a vertical section through the motor and gear box showing the manner in which the motor shaft is supported and the gear mechanism is driven from the shaft;

Fig. 4 is a section on the line 4—4 of Fig. 2 showing the top of the switch mechanism;

Fig. 5 is a side view of the mixer showing the mixing unit in an inoperative position;

Fig. 6 is a side view showing the beater elements removed, the juicer bowl in position on the motor, and the motor support in a position such as to prevent rotation of the motor about a horizontal axis;

Figure 1:
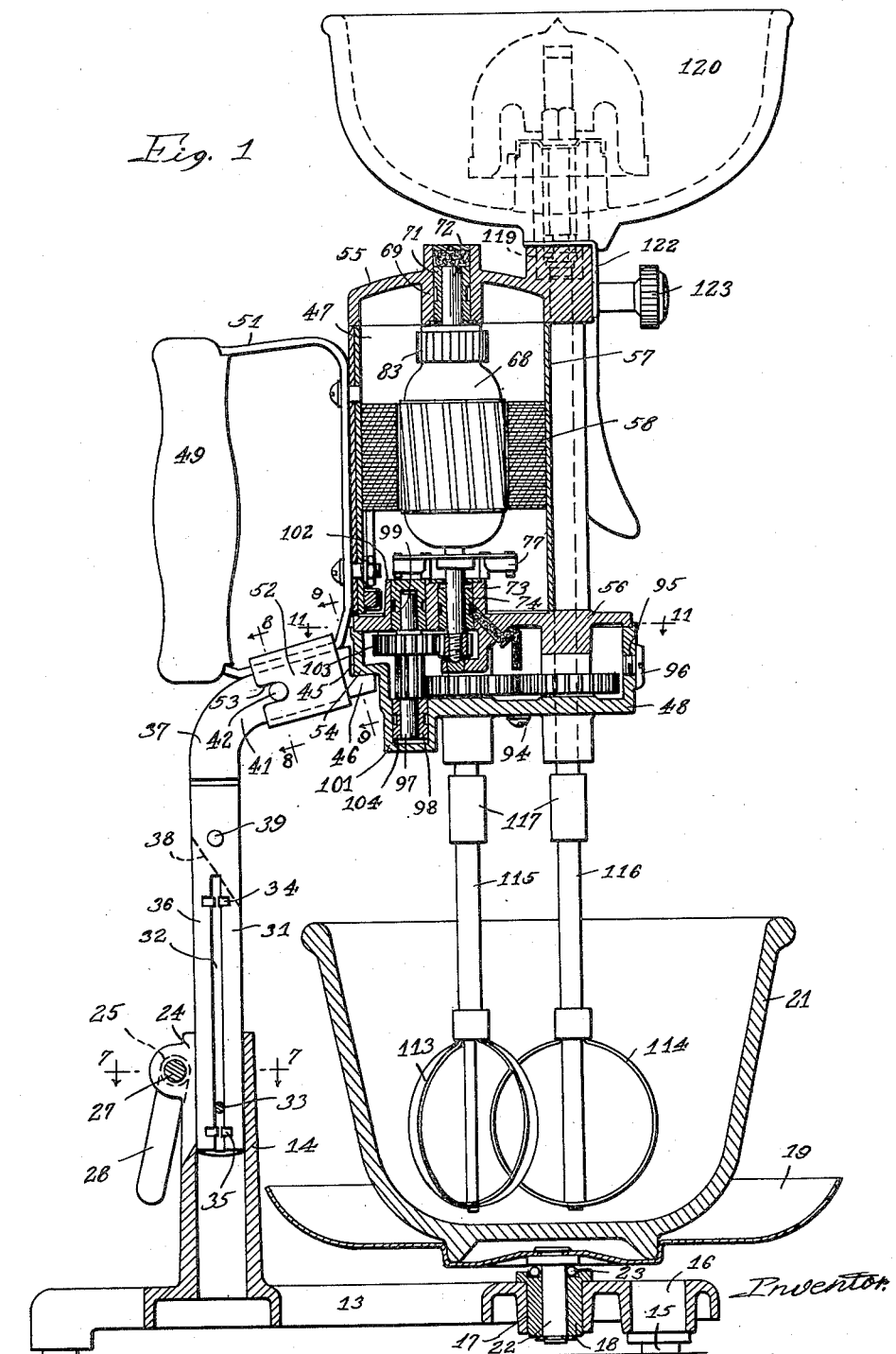
Figure 1 is a vertical view of the present embodiment of my invention, a portion of the mixer being shown in section.

Fig. 7 is a section on the line 7—7 of Figure 1;
Fig. 8 is a section on the line 8—8 of Figure 1;
Fig. 9 is a section on the line 9—9 of Figure 1;
Fig. 10 is a vertical section through the end of the motor housing and the gear box showing the manner in which the driving gears for the beater elements are supported and the manner in which the juicer shaft is connected and driven, and Fig. 11 is a section on the line 11—11 of Figure 1.

The invention contemplates the provision of a vertically disposed motor and a gear box arranged to drive the shafts of beater elements, the gear box being offset for the extension of one of the beater shafts along the side of the motor to drive a juicer attachment supported at the opposite end of the motor. Means are provided for supporting the motor for vertical adjustment and for rotation about a horizontal axis and for supporting a bowl or bowls in a position to receive the beater elements.

Referring first to Figure 1, the motor consists of a base, designated generally by the numeral 13, having a vertical sleeve-like standard 14. The base may advantageously be provided with feet 15 of rubber or other resilient material. The base is also provided with a plurality of sockets 16 and 17 for the reception of a bearing member 18 adapted to support a tray 19 upon which mixing bowls 21 of different sizes are positioned. The tray 19 is provided with a spindle 22 arranged to pass through the bearing block 18 and is supported upon ballbearings 23 interposed between the spindle and the bearing block. The bearing block 18 is arranged to be selectively positioned in the sockets 16 and 17 depending upon the size of the bowl being used upon the tray 19 for the purpose of rotatively supporting the bowl and tray in suitable operative position with respect to the beater elements presently to be described. The standard 14 is split from its upper edge downward, as shown at 24, and is provided with ears 25 and 26 having concentric openings, the opening in the ear 26 being threaded for the reception of the threaded shank 27 of a handle 28. The handle is provided with a shoulder 29 arranged to bear against the ear 25 so that upon rotation of the handle 28 the threaded shank 27 will be screwed into or out of the opening 26, thereby either increasing or decreasing the internal diameter of the standard.

The standard 14 is arranged to receive an upright, designated generally by the numeral 31, which is arranged to slide in the standard and be held at various positions by operation of the handle 28. The upright is provided with a longitudinal slot 32 along one side for the reception of a pin 33 positioned in the standard 14. This pin and slot prevent rotation of the upright in the standard. The edges of the slot are swaged, as shown at 34 and 35, so as to reduce the width of the slot at these points and form limits against which the pin 33 bears. The upright is provided with a hinged joint intermediate its ends dividing the upright into a lower portion 36 and an upper portion 37. In this instance, the joint is formed by slotting the upper end of the portion 36 to provide the groove of a tongue and groove connection. The lower end of the slot is sloped, as shown at 38. The lower end of the portion 37 is formed diagonally complemental to the lower end 38 of the slot and has its sides cut away so as to be receivable in the slot, thus forming the tongue of the tongue and groove connection. A pin 39 extends across the slot and through the tongue so that the upper portion 37 may rotate about this pin, the diagonal bottom of the slot and complemental end of the portion 37 serving to limit the amount of rotation of the portion 37. The upper portion 37 of the standard is bent intermediate its ends, as shown at 41, for the purpose of receiving and supporting a mixer and juicer unit presently to be described and is provided with a transverse pin 42 having a threaded end 43 for the reception of a nut 44 for the purpose of supporting the mixer unit on the upright, as will presently more fully appear. Likewise, the end of the upright is slotted off, as shown at 45, to provide a ledge 46 also for the support of the mixing unit.

The mixer unit consists of a motor designated generally by the numeral 47 having a gear box 48 secured to the lower end thereof. A handle 49 is secured to the side of the motor by means of a handle strap 51. A sleeve 52 is secured to the handle strap, as best shown in Figure 1, and is arranged to receive the upper end of the upright. The sleeve is provided with notches 53 at one of its ends for the reception of the pin 42, the pin and notches preventing rotation of the sleeve 52 on the upright. In order to increase the rigidity of the connection between the upright and the mixer unit, the gear box 48 is provided with a shoulder 54 arranged to rest upon the ledge 46.

The motor 47 is provided with a casing which may advantageously consist of head members 55 and 56 between which is secured a substantially circular body portion 57. The head members 55 and 56 may be formed of cast metal to give them rigidity and strength, while the body member 57 may be of formed sheet metal. The stationary portions 58 of the motor are supported directly on the frame, as best shown in Fig. 3. As shown in this figure, the head members 55 and 56 and the body member 57 are secured together by means of rods 59 and 61 which extend between the two head members, thus compressing the body member therebetween. These rods are threaded, as shown at 62 and 63, for reception into the head member 55 and are provided with shoulders 64 and 65 arranged to compress the laminated plates comprising the stationary portion of the motor against the head member 55. Nuts 66 and 67 serve to draw the head member 56 and the body member 57 firmly against the head member 55. The head member 55 is provided with a bearing housing 69 arranged to receive a circular bearing 71 for the reception of the end 72 of the motor shaft, while a bearing housing 73 in the head member 56 receives a bearing 74 to support the opposite end of the motor shaft. The motor shaft, however, extends beyond the end of the bearing 74 and has end thrust contact against a depending finger 75 on the head member 56, the finger 75 being spaced from the end of the bearing 74 a distance sufficient to permit the insertion of a spur gear 76 therebetween, the spur gear being mounted on the motor shaft for the purpose of driving gearing presently to be described. An air circulating member 77 is also mounted on the motor shaft for the purpose of circulating air through the motor casing. Brush holders 78 and 79 are mounted in the upper head member 55 and serve to support brushes 81 and 82 arranged to cooperate with a commutator 83 on the motor shaft. The body portion 57 of the casing is provided with a plurality of openings 84 to permit the circulation of air through the casing.

Novel switch means are provided for controlling the speed of the motor. Referring to Figs. 2 and 4, this switch consists of a lower plate 85 having a pin 86 passing therethrough arranged to pivotally support a contact lever 87 for rotation.

A knob 88 is positioned on the outer end of the lever for manual manipulation thereof. A second arcuate switch element 89 is positioned above the element 85 and is recessed between its ends to leave a space between the elements 85 and 89 for the operation of the lever 87. The element 89 is provided with contact points 91 extending into the space between the two elements and positioned for selective contact with the lever 87 upon rotation thereof. The contact points 91 and the pin 86 are connected with the motor so as to control the field windings thereof upon rotation of the lever 87 so as to control the speed of the motor. The switch is positioned in the motor between the head member 56 and the body member 57, the body member being cut out at its lower end for the reception thereof. The switch elements 85 and 89 are provided with slots 92 and 93 at opposite ends for the reception of the body member 57, so that the switch elements will be held therein against movement when the head member 56 is drawn tightly against the body member by the nuts 66 and 67. Thus the switch is held in the motor without the use of screws, bolts, or rivets of any kind and the mere act of assembling the motor serves also to assemble the switch mechanism.

The gear box 49 is positioned against the lower end of the head member 56 and is arranged to enclose the lower end of the motor shaft and the pinion 76 thereon. A gear housing is secured to the head member 56 by means of screws 97 and has an opening 95 normally closed by a screw 96 for the insertion of lubricant into the gear box. A shaft 97 is supported upon bearings 98 and 99 supported in bearing housings 101 and 102 in the gear housing 48 and the head member 56 and carries a gear 103 meshing with the pinion 76 and a pinion 104. Bearing housings 105 and 106 serve to support a beater shaft 107 having a gear 108 thereon between the bearing housings, the gear housing 48 also contain bearing housings 108 and 109 supporting a second beater shaft 111, this beater shaft also having a gear 112 between the bearing housings meshing with the gear 108, the gears 108 and 112 being such that the beater shafts will be driven at the same rate. The lower ends of the beater shafts 107 and 111 are provided with beater elements 113 and 114 adapted to be rotated upon rotation of the beater shafts. If desired, the lower ends 115 and 116 of the beater shafts may be made removable through the provision of detachable connections 117.

In order that the motor may be utilized for driving a supplemental attachment, such as a device for extracting the juice from fruits, the shaft 111 is caused to extend upward through the bearing housing 108 along the side of the motor, as best shown in Fig. 2, and passes through a bearing housing 118 in the head member 55. In order to enclose the shaft between the bearing housings 108 and 118, the body member 57 of the motor is caused to extend outward around this shaft to form a tubular enclosure, the body member 57, therefore, enclosing both the motor and the shaft 111.

The head member 55 is provided with a pedestal, designated generally by the numeral 119, for the reception of a juicer bowl 120, the juicer bowl having a downwardly extending spout 121 and a fastening plate 122 arranged to rest against the pedestal 119. A knurled stud bolt 123 is threaded into the side of the pedestal and is arranged to bear against the plate 122 to secure the juicer bowl to the motor. A juicer shaft 124 is positioned in the juicer bowl and is provided with a tongue 125 receivable in a slot in the upper end of the shaft 112, so that the juicer shaft 124 will be driven upon rotation of the shaft 112. A juicer ball 126 is supported on the upper end of the juicer shaft 124 for rotation with the shaft, the ball serving to ream the juice and pulp from citrous fruit when the fruit is pressed thereagainst in a well known manner.

Attention is directed to the various features of the present invention. The telescoping standard and upright permit adjustment of the vertical position of the motor and beater, so that the elevation of the beater elements 13 and 14 in the bowl 21 may be adjusted to bring about a desired turbulence within the bowl. The construction is, however, such as to prevent excessive movement or adjustment of the upright with respect to the standard. Means are provided in the standard for supporting the motor for rotation about a horizontal axis so that, in addition to the vertical adjustment of the motor, it may be rotated about a horizontal axis between an operative position and an inoperative position regardless of its elevation. This permits the removal of the bowl and the insertion thereof without any change in the elevation of the motor. Attention is also directed to the fact that regardless of this position, the beater unit may be removed from the upright for use as a hand beater in any portable use and may be re-positioned upon the upright without disturbing its setting.

The construction is such that the mixer may be used either as a stationary mixer, in which use the parts are all rigidly connected together, or the beater unit may be removed from its support for independent use as a portable mixer. The connection between the mixer unit and the upright is such as to provide a rigid and inflexible connection, due to the provision of the shelf 46 and the shoulder 54 and of the sleeve 52 and pin 42.

When the mixer is to be used solely as a juicer, the telescoping support for the unit is such that the upright 31 may be lowered into the standard a sufficient distance to prevent rotation of the beater unit about the pivot pin 39, this position being shown in Fig. 6. In this position, a rigid structure is provided for the juicing of fruits and one in which the juicer bowl is lowered a considerable distance to facilitate such use.

The construction is such that a vertically disposed motor is employed but in which both ends of the shaft 111 are employed for driving purposes. This is accomplished by offsetting the shaft 112 from the motor a sufficient distance to permit it to extend along the side of the motor and have bearing support in both of the head members of the motor, whereby a rigid support for the shaft is provided and whereby the body member of the motor may be employed for enclosing the shaft.

Novel means are provided for supporting the motor shaft which provides an end thrust bearing arranged to support the vertically disposed shaft and the provision of a driving pinion between the end thrust bearing and the radial thrust bearing at the bottom of the motor. This provides a permanent construction which prevents noisy operation of the motor after a small amount of wear has taken place in the bearing supports for the motor shaft.

While I have thus described and illustrated a specific embodiment of my invention, I am aware that numerous alterations and changes may be made therein without materially departing from the spirit of the invention or the scope of the appended claims, in which—

1. In a household mixer, a beater unit comprising a vertically disposed motor having a casing comprising head pieces at opposite ends of the casing and an intermediate body portion, a driven shaft extending along the side of the motor, enclosed within the body portion and having bearing support in the head pieces, a gear box at one end of the motor for driving said shaft, means at the lower end of the shaft for attaching a beater element thereto, and means at the upper end thereof for establishing driving connection with a supplemental implement.

2. In a household mixer, a beater unit comprising a vertically disposed motor including a casing and a vertically disposed motor shaft, a gear box positioned on one end of the casing, a beater element supported upon said gear box and casing, a gear train arranged to drive said beater element, said motor shaft extending from its casing to establish driving connection therewith, and a depending lip on said motor casing extending into said gear box and arranged to provide end thrust bearing for said motor shaft, said lip being spaced from said motor casing sufficient for the insertion of a driving gear therebetween on said motor shaft.

3. A combined mixer and juicer comprising a base, a beater unit including a motor, a depending removable beater element and a juicing mechanism, an upstanding sleeve on said base, an upright slidably supported in said sleeve hinged intermediate its ends arranged at its upper end to support said motor, and movable into the sleeve a distance sufficient to prevent rotation about the hinged point during the operation of the juicer mechanism.

4. A household mixer and juice extractor comprising a base having an upright sleeve-like standard at one end and a bowl-supporting portion at the opposite end, an upright arranged to slide in said standard and having an upper portion extending forwardly over said bowl-supporting portion, a mixing bowl mounted on said bowl-supporting portion, a mixer unit consisting of an electric motor and gearing at one end of the motor driven by the motor shaft, a pair of vertical beater shafts driven by said gearing and having beaters disposed for operation in said mixing bowl, said mixer unit being equipped with a socket member shaped to fit over said forwardly extending portion of the upright and to seat thereon for holding the mixer unit with its beaters in said operating position in the mixing bowl, said upright having a pivot joint whereby the motor unit may be tilted about a horizontal axis to carry the beaters into and out of said operating position in the mixing bowl, one of said beater shafts being extended to the top of the mixer unit and having means at its upper end for connection of an implement thereto, and a kitchen implement such as a juice extractor mounted on top of the motor unit and having driving connection with the upper end of said beater shaft, the beater ends of said beater shafts being removable to allow for movement of the upright to a lowered position in said standard, whereby to position the motor unit and said juice extractor in a lower position with the juice extractor in proximity to a bowl on said bowl-supporting portion.

5. A combined mixer and juicer comprising, a base, a beater unit including a motor, a depending removable beater element and a juicing mechanism, an upstanding sleeve on said base, an upright slidably supported in said sleeve hinged intermediate its ends arranged at its upper end to support said motor, and movable into the sleeve a distance sufficient to prevent rotation about the hinged point during the operation of the juicer mechanism, and means to secure the upright in any of a plurality of elevated positions for the operation of the beater element.

6. A combined mixer and juicer comprising a base, and a beater unit supported on the base comprising a motor having cast head pieces of heavy metal, a light weight sheet metal casing connecting the head pieces and enclosing the body of the motor, beater shafts carried on the lowermost of said head pieces, one of said shafts extending along the side of the motor and being enclosed within the casing, said beater shaft having bearing support in the head pieces, means on the uppermost head piece for supporting a juice extractor adjacent to the vertical center line of the motor, and means on one of said head pieces for removably supporting the beater unit on said base.

7. A household mixer comprising a base, a mixing bowl supported on the base, a mixer unit mounted on the base in a position overhanging the mixing bowl, said motor unit comprising an electric motor, the armature of which is on a vertical axis, the motor having a casing including a head at its lower end and a head at its upper end, a pair of vertical shafts journaled in the lower head, gearing in the lower head providing a driving connection between said shafts and the motor shaft, a pair of beater shafts having detachable driving connection with the lower ends of said motor driven shafts and equipped at their lower ends with beaters disposed in the mixing bowl, one of the motor driven shafts being on an axis within the motor casing and the other motor driven shaft being disposed at the peripheral edge of the motor and extending vertically along the motor casing and having a bearing in the upper head thereof, a kitchen implement adapted to be power driven, means for supporting said implement on the upper head of the motor, and means for driving said implement from the upper end of said extended motor driven shaft, said motor support including means for supporting the mixer unit in upper and lower working positions, the upper working position being for mixing operations with the beaters disposed in the mixing bowl and the lower working position being with the beater shafts removed so that the mixer unit together with the implement supported thereon is disposed in close proximity to the base.

8. A household mixer as set forth in claim 7, in which the means for supporting the mixer unit has a horizontal pivot upon which the motor unit may be swung to carry the beaters into and out of the mixing bowl, and means whereby said pivotal movement is operative when the motor unit is in the upper working position and inoperative when it is in the lower working position.

9. A household mixer as set forth in claim 7, including a handle mounted on the motor casing, the support for the mixer unit including an upright on the base, and means supporting the mixer unit on the upright and permitting quick detachment from the upright, whereby through manipulation of the handle the mixer unit may be removed from the upright and used as a portable mixing implement.

10. A household mixer as set forth in claim 7, in which the support for the mixer unit includes a tubular upright fixed to the base, an upright adapted to telescope vertically within the tubular upright and having a laterally extending upper end, means attached to the mixer unit shaped for fitting said laterally extending end of said support for holding the mixer unit in working position thereon and providing for quick detachment therefrom, and means operative between the telescoping supporting members for holding the movable member in the upper and lower working positions, respectively, and providing for quick adjustment from one position to the other.

HERMANN M. ALFRED STRAUSS.